Feb. 20, 1934.  P. C. WITHROW ET AL  1,948,151
TRUCK FRAME
Filed Oct. 3, 1932  2 Sheets-Sheet 1
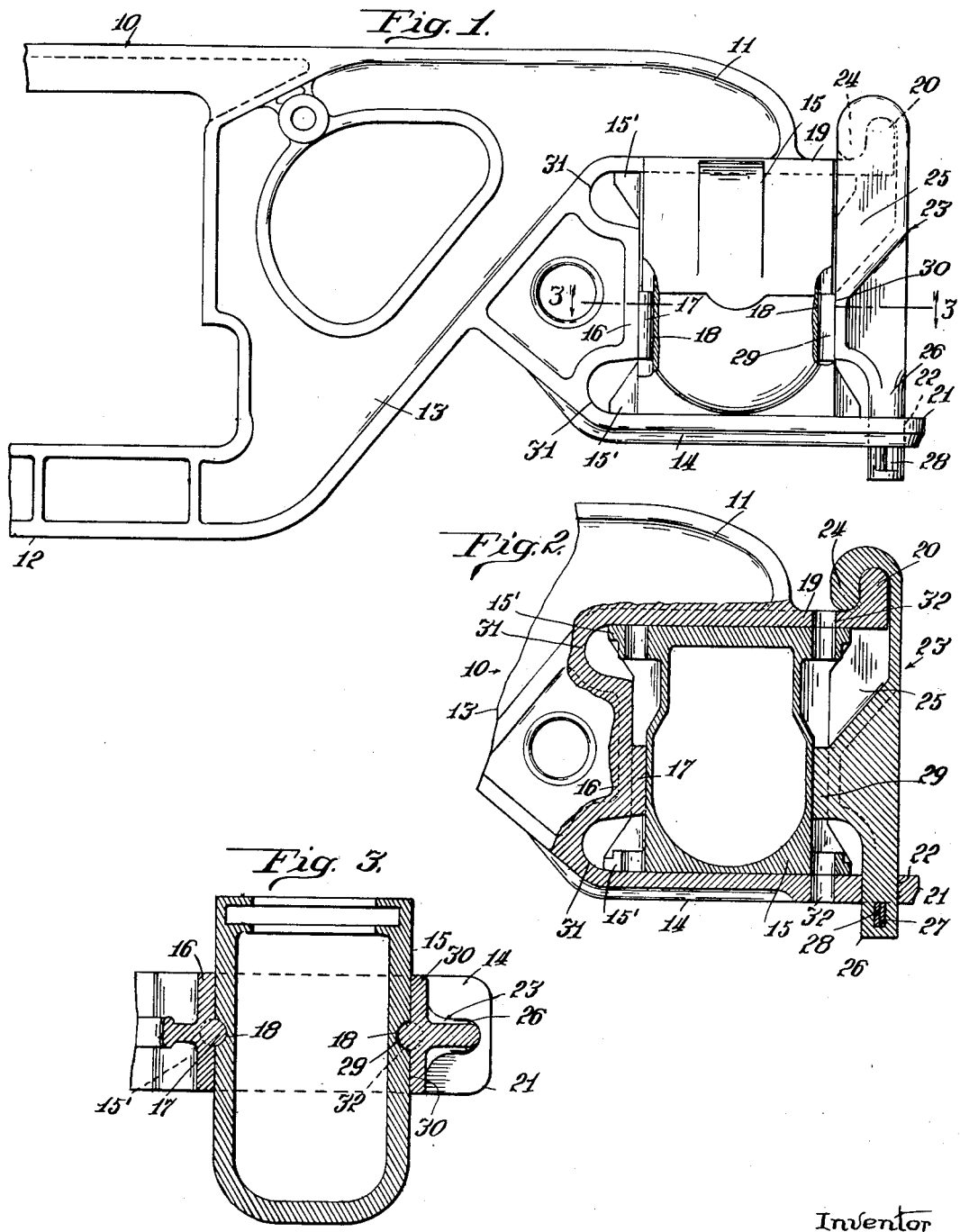

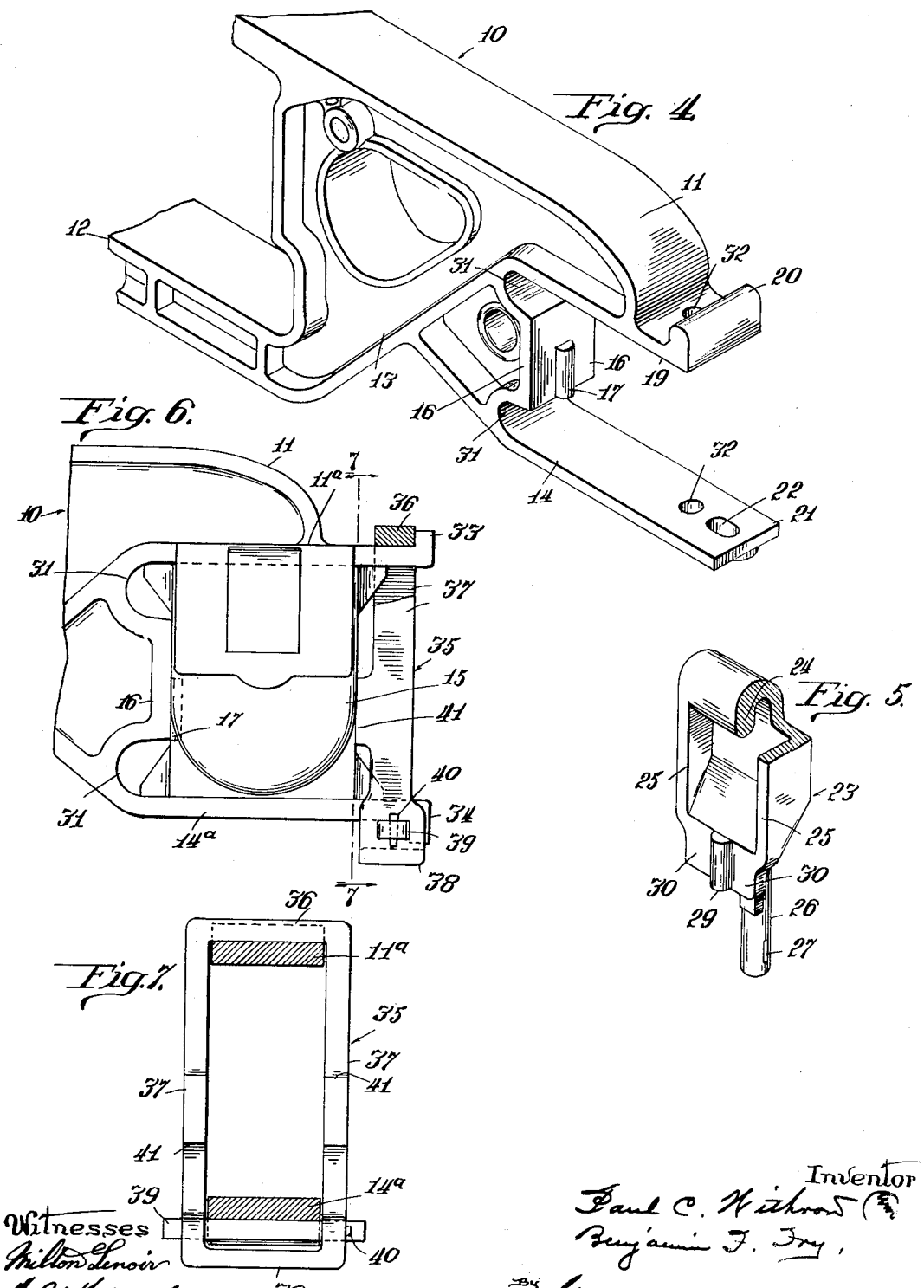

Patented Feb. 20, 1934

1,948,151

UNITED STATES PATENT OFFICE 1,948,151

TRUCK FRAME

Paul C. Withrow and Benjamin F. Fry,
Denver, Colo.

Application October 3, 1932. Serial No. 635,979

14 Claims. (Cl. 105—221)

The object of our invention is the provision of an integral or single piece truck frame formed at the ends to provide journal box receiving pockets formed so as to permit removal of the journal box endwisely of the frame and thus necessitating a minimum vertical movement of the frame to permit such removal of the box.

Another object of the invention is the provision of a single piece truck frame having integral top and bottom portions adapted to extend across the top and bottom of the journal box for firmly securing the latter in place and thus affording greater rigidity and obviating the use of bolts or rivets and the difficulties usually attending such structures through the loosening and loss of the rivets or bolts.

Our invention involves a truck frame whereby wide, flat contact or engagement with all sides of the journal box is afforded, with one of the side engaging portions in the nature of a readily removable lock member which does not involve the use of constantly loosening nuts.

The objects and advantages above recited, as well as other advantages inherent in the invention, will all be readily comprehended from the following detailed description of the accompanying drawings, wherein:

Figure 1 is a side elevation of one end of the truck frame involving our invention, with the journal box being shown in section and the journal and wheel omitted.

Figure 2 is a vertical sectional view of the journal box receiving portion of the frame, the box locking member and the journal box.

Figure 3 is a cross sectional view taken substantially on the line 3—3 of Figure 1, as viewed by the arrows.

Figure 4 is a perspective view of one end of our improved frame, with the journal box and locking member removed.

Figure 5 is a detail perspective view of the locking member employed in Figure 1; a portion of the member being in section to more clearly disclose the construction at top.

Figure 6 is a side elevation of one end of the truck frame provided with a journal box, illustrating a modification and modified form of locking means, with a portion of the latter broken away and shown in section.

Figure 7 is a vertical sectional view taken substantially on the line 7—7 of Figure 6 as viewed by the arrows.

As our invention relates to the journal box receiving portions or ends of the truck frame, merely one end of the frame has been shown in the drawings; it being understood, of course, that the other end of the frame is similar in construction to the end shown, so that description of one end will suffice.

Our invention relates to a truck frame of general construction so far as the intermediate portion thereof is concerned, involving the usual bolster, springs, spring seats and brake hangers as now in general use; the portions or ends for the reception and supporting of the journal boxes being made according to our invention, which also involves means for locking the journal box in place.

We are aware that cast metal truck frames involving a single piece structure have been in use, but these frames do not involve a single piece truck frame provided with an integral journal box bottom supporting element; with the frame so constructed that wide, flat contacting surfaces for the sides of the box are provided.

In the particular exemplification of the invention as disclosed in the first five figures of the drawings, 10 is a portion of the truck frame, of a general design, provided with a top member 11; the spring pocket bottom member 12, connected with the top member 11 by the diagonal web portion 13.

The web portion 13 is provided with an integral extension or journal box pocket bottom member 14, which is adapted to extend transversely of the bottom of the journal box shown in section at 15.

The bottom member 14 and the web 13 are further united by the integral vertical portion or element 16 which constitutes one side wall of the journal box receiving pocket. This side wall portion 16 is preferably of the same width as the bottom member 14, see Figure 3, as well as the width of the top member 11, and as a result a wide contact surface for the side of the journal box is provided.

The vertical side wall portion 16 is shown provided with a vertically disposed lug 17, preferably adjacent the lower end of portion 16 where the journal box is of greater transverse dimensions or width. The side wall of this portion of the journal box is provided with a complemental groove or socket at 18 adapted to receive the lug 17; the lug 17 and socket or groove 18 being preferably of the arcuate formation shown.

As is apparent, the lug and socket will prevent movement of the box transversely of the frame.

The top member 11 is provided with a horizontally disposed end 19, which terminates in the upturned end or upstanding boss 20; while the bottom member 14 extends slightly beyond the vertical plane of boss 20, as shown at 21, and this extended end provided with a suitable aperture or slot 22, see Figure 4.

These extended ends of the top member 11 and bottom member 14 are intended to receive the removable side wall of the journal box pocket or lock member, the preferred embodiment whereof is shown at 23. This lock member, shown in detail in Figure 5, at top is in the nature of a shrouded hook 24 adapted to engage or hook over the upstanding end or boss 20 of the top member 11; while the shroud portion 25 provides a pocket adapted to extend about opposite sides of the extended end 19 and the boss 20, see Figure 1. The lower end of the lock member 23 is reduced to provide the stem or pin portion 26 adapted to pass through the aperture 22 of the bottom member 14; the lower portion 26 may have any desirable cross-sectional shape suitable for passage through an aperture in the bottom member 14.

The pin portion 26 is shown with a transverse aperture 27 to receive a suitable key or cotter as at 28 in Figures 1 and 2.

The lock member 23 on its journal box facing side is shown provided with a vertically disposed lug 29, substantially similar to lug 17, and adapted to enter a complemental socket 18 in the adjacent side of the journal box. The shroud portion 25, at its bottom, namely on opposite sides of the lug 29 as shown at 30, provides a wide flat contact surface for the side of the journal box; this flat contact surface being coextensive with the width of the top and bottom members 11 and 14 of the truck frame and thus affords a wide bearing surface for the journal box, like side 16.

In order to adapt the frame to the present day construction of journal box, the side wall or vertical portion 16 of the frame, at top and bottom is concaved or dished out at 31, 31, for reception of the journal box bolt receiving flanges or lugs 15', 15', while the construction of the locking member 23 takes care of the bolt receiving flanges on that side of the box. With our improved frame and locking member the use of bolts, passing through the side walls or flanges of the box, and hence nuts at the ends of the bolts are entirely eliminated. As a matter of precaution, we show the top and bottom members 11 and 14 provided with the registering holes at 32 for the reception of a bolt in the event of loss or misplacement of the locking member.

With the lugs 17 and 29 it is apparent that relative movement between the journal box and frame in a direction transversely of the frame or lengthwise of the journal is impossible. On the other hand insertion of the journal boxes into the pockets at the ends of the frame, as well as the removal thereof, may be very easily accomplished by removing the split key or cotter pin 28 from the lower end of the locking member 23, which then permits the locking member 23 to be raised and its upper hook-end 24 disengaged from the boss or upturned end 20 of the frame end, at which time the lower end 26 will also be free of the bottom frame member 14.

By jacking up the frame sufficiently to relieve the box of the weight, namely not more than an eighth of an inch, endwise removal of the journal-box is possible not only at a great saving of time and labor, but a much less hazardous operation than is the case with truck frame constructions as heretofore employed.

It is apparent that certain modified forms of the locking member may be made and an exemplification of one form of modification is disclosed in Figures 6 and 7. The general construction of the truck frame is the same as heretofore described, namely with an integral bottom member 14a as well as an integral top member 11a and the vertical side wall 16 having the vertical lug 17. In this modification, the extended end portion of the top member 11a is shown with an upturned immediate end 33; while the bottom member 14a is provided with a downwardly disposed or bent end 34.

The locking member 35 is shown in the nature of a yoke or rectangular frame having a top bar 36; two vertically disposed side bars 37, 37 and bottom member or bar 38.

The distance between the top bar 36 and the bottom bar 38 is greater than the distance between the upturned end 33 and the downturned end 34, so as to permit the yoke or locking member to be easily placed onto the top and bottom frame members 11a and 14a.

The side bars 37, 37 at their lower ends are shown slightly enlarged laterally and at a distance above the bottom bar 38, namely in a horizontal plane above the bottom of the downturned end 34, are provided with openings adapted to receive the locking key 39, shown locked in place by a cotter or other suitable pin 40. The lock member 35 is hung onto the top frame member 11a back of the upturned end 33 and the locking key then passed through the openings in the side bars 37, 37; the key 39 being disposed transversely of the truck frame immediately rearward of the downturned end 34. The side bars 37, 37, intermediate of their ends, are shown enlarged at 41, 41 so as to engage the adjacent side of the journal-box 15, thereby preventing relative movement between the box and the truck frame in a direction lengthwise of the truck frame and therefore also maintaining the interlocking relation between the journal box side wall and the frame vertical side wall 16 with its lug 17.

It is apparent that removal of the journal-box in this construction in a direction endwisely of the truck frame may likewise be readily accomplished upon a slight raising of the truck frame just sufficient to relieve the box of the weight and then removing the locking key 39 which permits the lock member 35 to be lifted off the ends of the truck frame.

With our improved truck frame, wide flat contacts with both sides of the journal boxes are provided and hence improper relative movement made impossible; the frame being designed to permit use of removable journal boxes, secured in place by means other than the usual bolted or riveted attachments at present employed; the improved frame permitting removal of the boxes endwisely of the frame and hence requiring only a minimum vertical movement of the frame to permit such removal and therefore resulting in a great saving of time and labor while eliminating the great hazards attending such operations with truck frame constructions as at present employed.

We have shown what are believed to be simple embodiments of the invention; the invention having been described in terms employed merely as terms of description and not as terms of limitation, as structural modifications are possible and may be made without, however, departing from the spirit of our invention.

What we claim is:

1. A truck frame, the journal box receiving ends whereof each comprise top, bottom and a vertically disposed side member adapted to provide flat bearing surfaces arranged to engage with the journal boxes; the free end of the top member having an upwardly disposed portion, and locking means arranged at the outer ends of the top and bottom members adapted to interlock with the upwardly disposed portion of the top member and have non-shifting relation with the bottom member, said means being formed to provide a wide bearing surface for the side of the journal box and being independent of the boxes.

2. A truck frame having journal box receiving pockets at the ends composed of horizontally extending members adapted to engage with and provide flat bearing surfaces for the tops and bottoms of the journal boxes, the top members at their ends having upwardly disposed portions; vertical members with flat bearing surfaces adapted to engage externally with one of the sides of the boxes, the flat surfaces of said members each having a lug adapted to form interlocking engagement with the boxes against movement transversely of the frame; pocket closing vertical members provided with flat bearing surfaces adapted to engage externally with the other side of the boxes, the upper end of said last members being adapted to have interlocking engagement with the upwardly disposed portions of the top members of the truck frame; and means adapted to cooperate with the lower ends of said last mentioned members and with the bottom members of the truck frame whereby upward movement of said last mentioned members is prevented.

3. A truck frame having journal box receiving pocket composed of integral horizontally extending members adapted to engage with the top and bottom of the journal box, at least one of said members at its ends being provided with a vertically disposed portion; integral vertical member adapted to engage one of the sides of the box and form interlocking engagement therewith to prevent movement transversely of the frame; a single piece pocket closing member having flat surfaces adapted to engage the other side of the box and form interlocking engagement therewith, one end of said single piece member being formed to interlock with the vertically disposed portion of one of the horizontally disposed members of the frame; and means adapted to cooperate with the other end of the single piece member and the adjacent horizontally disposed member of the frame for preventing vertical movement of the single piece member.

4. A truck frame having journal box receiving ends composed of horizontally extending members and vertical members, all formed integral with each other and with the main portion of the truck frame, said members being formed to provide wide, flat bearing surfaces for the top, bottom and one of the sides of the journal boxes; and removable single piece members adapted to provide wide flat bearing surfaces for the other sides of the boxes, the ends of the horizontal members and said removable members being formed to have interlocking engagement with each other through relative vertical movement.

5. A truck frame, the journal box receiving ends whereof are composed of integral horizontally extending members having outwardly flanged ends and vertical members, all having flat bearing surfaces adapted to engage with the journal boxes at top, bottom and one of the sides, the vertical members being provided with flat bearing surfaces and with protruding portions adapted to form interlocking engagement with the side walls of the journal boxes; and removable vertically disposed single piece members adapted to engage the other sides of the journal boxes and provided with flat bearing surfaces and with protruding portions adapted to form interlocking engagement with the journal box sides, said single piece members being adapted to receive the flanged ends of the horizontally extending members and form interlocking engagement therewith through vertical movement.

6. A truck frame having journal box receiving ends composed of integral horizontally extending vertically spaced members and vertically extending members adapted to provide bearing surfaces for the tops, bottoms and one of the sides of the journal boxes; the outer ends of the upper horizontally extending members having upwardly disposed portions; single piece locking members having flat bearing surfaces for the adjacent sides of the journal box and formed to interlock with said upwardly disposed portions; and means cooperating with the lower ends of the locking members whereby the members are held in position relative to the lower horizontally extending members and upward movement of the locking members prevented.

7. A truck frame having journal box receiving ends composed of integral, vertically spaced, horizontal members for engaging the tops and the bottoms of the journal boxes, the outer ends of said members having vertically disposed portions; vertically extending members integral with the main part of the truck frame adapted to engage one of the sides of the journal box; and removable single piece locking means adapted to form interlocking engagement with the vertically disposed portions at the ends of the horizontal members through vertical movement and to engage with the other side of the journal box.

8. A truck frame having journal box receiving ends comprising horizontally disposed members adapted to engage with the tops and bottoms of the boxes; and vertical members adapted to contact with the outer sides of the boxes, the vertical member at each outer end of the frame being removable, composed of a single piece and adapted to have interlocking engagement with the ends of the horizontally disposed members of the frame through vertical movement.

9. A truck frame having journal box receiving ends comprising horizontally disposed members adapted to engage with the tops and bottoms of the boxes; and vertical members adapted to engage the outer sides of the boxes, certain of said vertical members being formed integral with the frame, while the other vertical members are removable and each made of a single piece adapted to have interlocking engagement with the horizontally disposed members of the frame through vertical movement.

10. A truck frame having journal box receiving ends composed of vertically spaced horizontally extending members for engaging the tops and the bottoms of the journal boxes, the outer ends of at least one of the members at each end being disposed vertically in a direction away from the other of said members; vertically disposed members for engaging one of the sides of the journal boxes; all of said members being integral with the main part of the truck frame; single piece locking members formed to receive the horizontal members with the vertically disposed ends to form interlocking engagement therewith, said locking members being adapted to engage the other sides of the journal boxes; and means adapted to cooperate with the locking members and the other of said horizontally disposed frame members for holding the locking members against movement.

11. In a truck frame, the combination of a journal box the sides whereof are provided with recesses; vertically spaced horizontally disposed members adapted to engage the top and the bottom of the journal box; a vertically disposed member adapted to engage one side of the journal box and having a protrusion adapted to enter the recess in the box side wall; and a locking member having a protruding portion adapted to enter the recess in the adjacent side wall of the box, said locking member and the ends of the horizontally disposed members being formed to effect interlocking engagement with each other through vertical movement of the locking member.

12. A truck frame having journal box receiving pockets comprising horizontally disposed members provided with flat bearing surfaces adapted to engage with the tops and bottoms of the boxes; vertically disposed walls at the inner ends of the pockets integral with the horizontally disposed members and provided with flat bearing surfaces adapted to engage the side walls of the boxes; and single piece members having flat bearing surfaces at the outer ends of the pockets, the upper ends of said single piece members being adapted to receive the ends of the top frame members and have interlocking engagement therewith, while the lower ends of the single piece members are adapted to cooperate with the bottom frame members and prevent upward movement of the single piece members.

13. A truck frame having journal box receiving recesses at the ends each composed of horizontally disposed journal box top and bottom engaging members, at least one of which has an end portion disposed vertically away from the recesses, and a journal box side engaging member all formed integral with the main portion of the truck frame; a removable journal box side engaging single piece member formed to receive the horizontal member having the vertically disposed end portion and effect interlocking engagement therewith; and means whereby said single piece member is secured to the other horizontal frame member and its interlocking engagement maintained.

14. A truck frame having open sided journal box-receiving pockets at the ends, each pocket being formed by a top, bottom and one vertical side member all provided with wide journal box engaging surfaces, the vertical side member having a vertically disposed rib, while the top member is provided with an upturned portion; a removable single piece side forming member adapted to provide flat bearing against the side of the journal box and arranged to interlock with the upturned portion of the top member when moved vertically; and means cooperating with the lower end of said single piece member and with the bottom member whereby vertical movement of the single piece member is prevented.

PAUL C. WITHROW.
BENJAMIN F. FRY.